(12) United States Patent
Stamenkovich

(10) Patent No.: US 12,679,414 B2
(45) Date of Patent: Jul. 14, 2026

(54) REDUNDANT LANE DETECTION FOR AUTONOMOUS VEHICLES

(71) Applicant: TORC Robotics, Inc., Blacksburg, VA (US)

(72) Inventor: Joseph Stamenkovich, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 311 days.

(21) Appl. No.: 18/342,132

(22) Filed: Jun. 27, 2023

(65) Prior Publication Data

US 2025/0002044 A1     Jan. 2, 2025

(51) Int. Cl.
 *B60W 60/00*     (2020.01)

(52) U.S. Cl.
 CPC ... *B60W 60/0015* (2020.02); *B60W 2420/408* (2024.01); *B60W 2554/80* (2020.02)

(58) Field of Classification Search
 CPC ....... B60W 60/0015; B60W 2420/408; B60W 2554/80; B60W 2552/53; B60W 2554/4041; G01C 21/3658; G01C 21/3848
 See application file for complete search history.

(56) References Cited

U.S. PATENT DOCUMENTS

| | | | | |
|---|---|---|---|---|
| 10,929,692 | B2 * | 2/2021 | Schachter | ............. G01S 15/931 |
| 2022/0114374 | A1 * | 4/2022 | Khatri | ....................... G06T 7/70 |
| 2023/0278554 | A1 * | 9/2023 | Hemmati | ............. B60W 30/12 |

OTHER PUBLICATIONS

Shengke Niu, Yilin Ma, and Chong Wei "Night-time lane positioning based on camera and LiDAR fusion", Proc. SPIE 12591, Sixth International Conference on Traffic Engineering and Transportation System (ICTETS 2022), 125911H (Feb. 16, 2023); https://doi.org/10.1117/12.2668596.*

* cited by examiner

*Primary Examiner* — Peter D Nolan
(74) *Attorney, Agent, or Firm* — Armstrong Teasdale LLP

(57) ABSTRACT

Systems and methods of automatic correction of map data for autonomous vehicle navigation are disclosed. An autonomous vehicle system can receive first sensor data from a first sensor of an autonomous vehicle and second sensor data from a second sensor of the autonomous vehicle, the first sensor data and the second sensor data captured during operation of the autonomous vehicle; generate, based on the first sensor data, a first prediction of a dimension of a lane of a road; generate, based on the second sensor data, a second prediction of a position of the autonomous vehicle within the lane of the road; determine a confidence value for the second prediction of the position of the autonomous vehicle within the lane of the road based on the first prediction and the second prediction; and navigate the autonomous vehicle based on the confidence value.

20 Claims, 5 Drawing Sheets

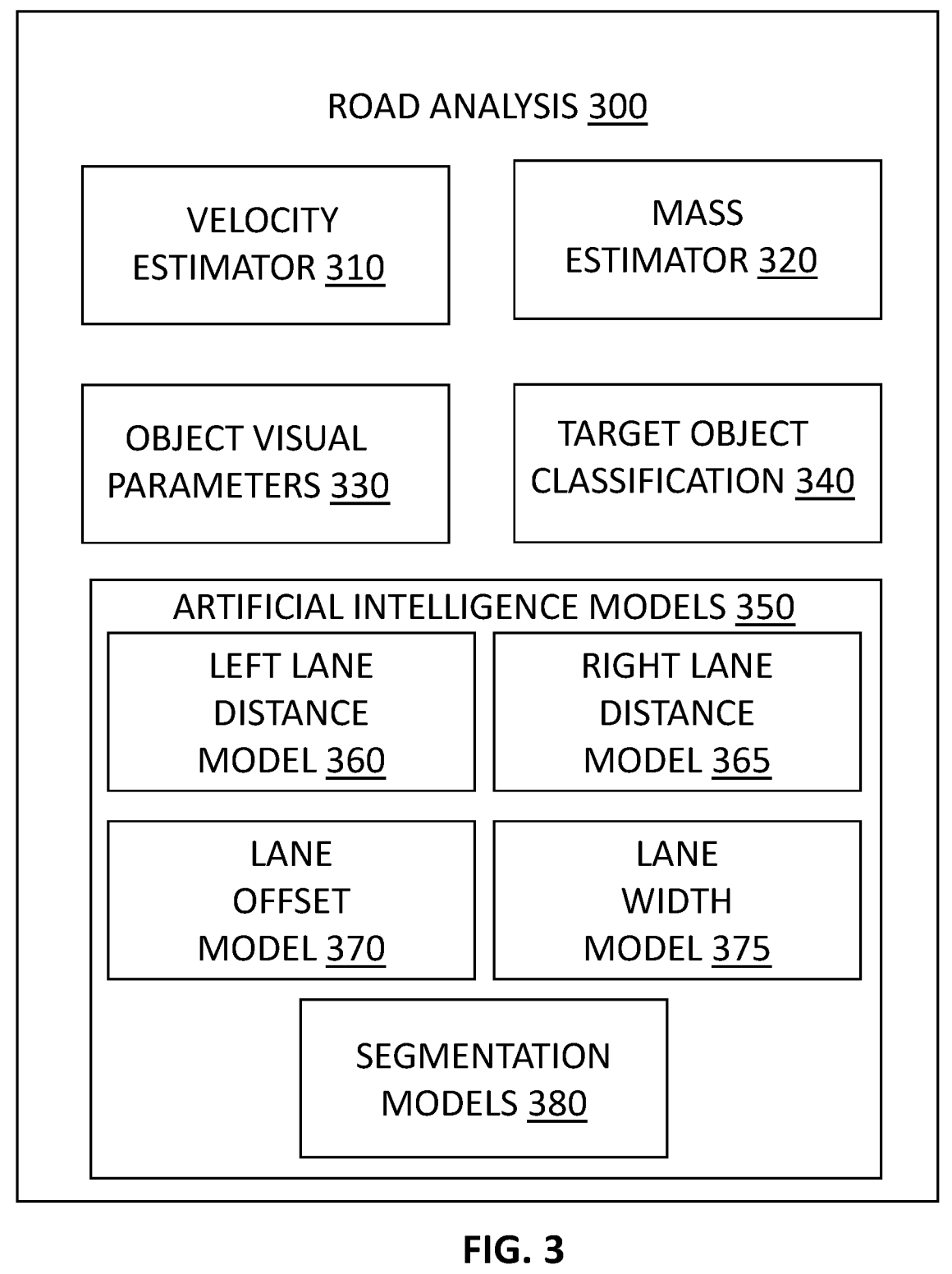

ROAD ANALYSIS 300

VELOCITY
ESTIMATOR 310

MASS
ESTIMATOR 320

OBJECT VISUAL
PARAMETERS 330

TARGET OBJECT
CLASSIFICATION 340

ARTIFICIAL INTELLIGENCE MODELS 350

LEFT LANE
DISTANCE
MODEL 360

RIGHT LANE
DISTANCE
MODEL 365

LANE
OFFSET
MODEL 370

LANE
WIDTH
MODEL 375

SEGMENTATION
MODELS 380

FIG. 3

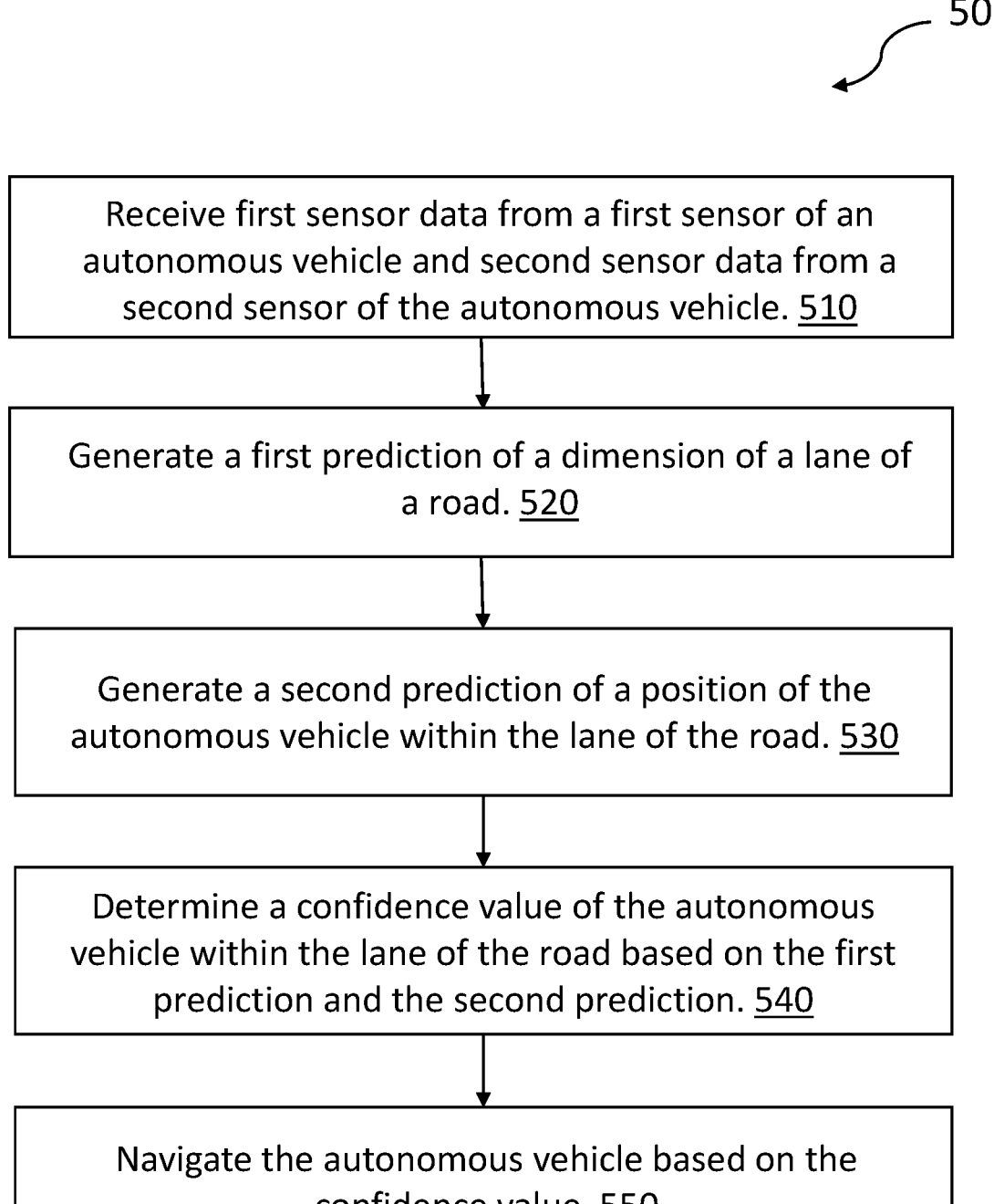

500

Receive first sensor data from a first sensor of an autonomous vehicle and second sensor data from a second sensor of the autonomous vehicle. 510

Generate a first prediction of a dimension of a lane of a road. 520

Generate a second prediction of a position of the autonomous vehicle within the lane of the road. 530

Determine a confidence value of the autonomous vehicle within the lane of the road based on the first prediction and the second prediction. 540

Navigate the autonomous vehicle based on the confidence value. 550

FIG. 5

REDUNDANT LANE DETECTION FOR AUTONOMOUS VEHICLES

TECHNICAL FIELD

The present disclosure relates to autonomous vehicles and, more specifically, to techniques for redundant lane detection for autonomous vehicles.

BACKGROUND

The use of autonomous vehicles has become increasingly prevalent in recent years, with the potential for numerous benefits. To autonomously navigate, autonomous vehicles use sensors to capture data about their environment to determine the position of road features, such as lane lines, relative to the autonomous vehicle. Conventional approaches for detecting lane lines use segmentation of the ground plane. However, segmentation algorithms alone lack sufficient accuracy for autonomous navigation.

SUMMARY

The systems and methods of the present disclosure may solve the problems set forth above and/or other problems in the art. The scope of the current disclosure, however, is defined by the attached claims, and not by the ability to solve any specific problem.

Disclosed herein are techniques for redundant lane detection that enable autonomous vehicle navigation without necessarily relying on external sources of road information, such as locally stored map data, which may be out-of-date or inaccurate. Conventional autonomous vehicles rely on segmentation algorithms and locally stored map data to detect the presence and location of lane lines in the environment. The techniques described herein address these issues by providing redundant lane detection, which utilizes several discrete artificial intelligence models and sources of sensor data in combination to detect lane lines.

The artificial intelligence models may be regression models, neural networks, or other types of machine-learning models that can receive light detection and ranging (LiDAR) and/or camera images from various sensors mounted on the autonomous vehicle in different locations. The combination of sensor data acts as a supplement to detection via a single modality, and improves upon techniques that rely on a single source of sensor data or a single detection method to identify and track lane lines. In particular, the techniques described herein utilize complementary sensors, which enable accurate detection in a variety of contexts and road conditions.

One embodiment of the present disclosure is directed to a method. The method may be performed, for example, by one or more processors coupled to non-transitory memory. The method includes receiving first sensor data from a first sensor of an autonomous vehicle and second sensor data from a second sensor of the autonomous vehicle, the first sensor data and the second sensor data captured during operation of the autonomous vehicle; generating, based on the first sensor data, a first prediction of a dimension of a lane of a road; generating, based on the second sensor data, a second prediction of a position of the autonomous vehicle within the lane of the road; determining a confidence value for the second prediction of the position of the autonomous vehicle within the lane of the road based on the first prediction and the second prediction; and navigating, by the one or more processors, the autonomous vehicle based on the confidence value.

The first sensor data may comprise LiDAR data and the second sensor data may comprise image data. Generating the first prediction may comprise executing a first artificial intelligence model trained to generate the first prediction using the first sensor data as input. Generating the second prediction may comprise executing a second artificial intelligence model trained to generate the second prediction using the second sensor data as input. The first artificial intelligence model may comprise a regression model and the second artificial intelligence model comprises a neural network. The method may include generating a third prediction of the position of the autonomous vehicle within the lane of the road based on the first sensor data; and determining the confidence value for the second prediction of the position of the autonomous vehicle within the lane of the road further based on the third prediction.

The method may include executing a segmentation algorithm using the first sensor data or the second sensor data to generate a segmentation of the first sensor data; and determining the confidence value for the second prediction of the position of the autonomous vehicle within the lane of the road further based on the segmentation. The first prediction may comprise a prediction of a width of the lane. The second prediction may comprise a distance from a left lane line, a distance from a right lane line, or a distance from a center of the lane. The method may include determining, based on the first sensor data or the second sensor data, a lane offset for the autonomous vehicle.

One other embodiment of the present disclosure is directed to a system. The system includes one or more processors coupled to non-transitory memory. The system can receive first sensor data from a first sensor of an autonomous vehicle and second sensor data from a second sensor of the autonomous vehicle, the first sensor data and the second sensor data captured during operation of the autonomous vehicle; generate, based on the first sensor data, a first prediction of a dimension of a lane of a road; generate, based on the second sensor data, a second prediction of a position of the autonomous vehicle within the lane of the road; determine a confidence value for the second prediction of the position of the autonomous vehicle within the lane of the road based on the first prediction and the second prediction; and navigate the autonomous vehicle based on the confidence value.

The first sensor data may comprise LiDAR data and the second sensor data may comprise image data. The system may generate the first prediction by performing operations comprising executing a first artificial intelligence model trained to generate the first prediction using the first sensor data as input. The system may generate the second prediction by performing operations comprising executing a second artificial intelligence model trained to generate the second prediction using the second sensor data as input. The first artificial intelligence model may comprise a regression model and the second artificial intelligence model may comprise a neural network.

The system may generate a third prediction of the position of the autonomous vehicle within the lane of the road based on the first sensor data; and determine the confidence value for the second prediction of the position of the autonomous vehicle within the lane of the road further based on the third prediction. The system may execute a segmentation algorithm using the first sensor data or the second sensor data to generate a segmentation of the first sensor data; and determine the confidence value for the second prediction of the position of the autonomous vehicle within the lane of the road further based on the segmentation. The first prediction may comprise a prediction of a width of the lane. The second prediction may comprise a distance from a left lane line, a distance from a right lane line, or a distance from a center of the lane. The system may determine, based on the first sensor data or the second sensor data, a lane offset for the autonomous vehicle.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

FIG. 3 is a schematic diagram of a road analysis module of the autonomy system of an autonomous vehicle, according to an embodiment.

FIG. 5 is a data flow diagram showing processes for redundant lane detection for autonomous vehicle operation, according to an embodiment.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Figure 1:
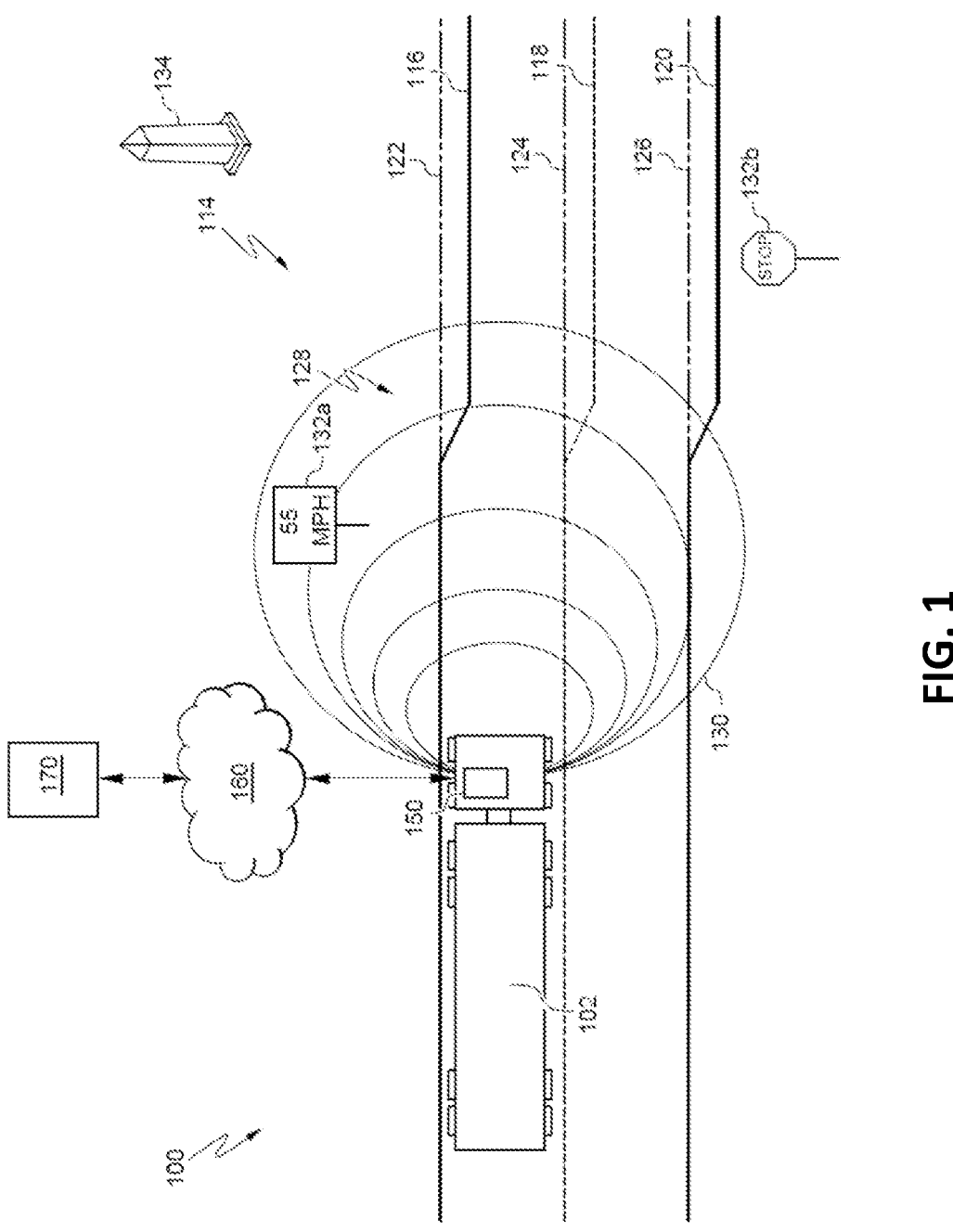
FIG. 1 is a bird's eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of the truck 102 may be completely autonomous (fully autonomous), such as self-driving, driverless, or Level 4 autonomy, or semi-autonomous, such as Level 3 autonomy. As used herein, the term "autonomous" includes both fully autonomous and semi-autonomous. The present disclosure sometimes refers to autonomous vehicles as ego vehicles. The autonomy system 150 may be structured on at least three aspects of technology: (1) perception, (2) localization, and (3) planning/control. The function of the perception aspect is to sense an environment surrounding truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, signs, etc.) and features of the road (e.g., lane lines, shoulder lines, geometries of road features, lane types, etc.) around the truck 102, and classify the objects in the road distinctly.

The localization aspect of the autonomy system 150 may be configured to determine where on a pre-established digital map the truck 102 is currently located. One way to do this is to sense the environment surrounding the truck 102 (e.g., via the perception system) and to correlate features of the sensed environment with details (e.g., digital representations of the features of the sensed environment) on the digital map. The digital map may be included as part of a world model, which the truck 102 utilizes to navigate. The world model may include the digital map data (which may be updated and distributed via the various servers described herein) and indications of real-time road features identified using the perception data captured by the sensors of the autonomous vehicle. In some implementations, map data corresponding to the location of the truck 102 may be utilized for navigational purposes. For example, map data corresponding to a predetermined radius around or region in front of the truck 102 may be included in the world model used for navigation. As the truck 102 navigates a road, the world model may be updated to replace previous map data with map data that is proximate to the truck 102.

Once the systems on the truck 102 have determined its location with respect to the digital map features (e.g., location on the roadway, upcoming intersections, road signs, etc.), and the map data has been compared to locally identified road features to identify discrepancies, as described herein, and to update the world model, the truck 102 can plan and execute maneuvers and/or routes with respect to the features of the road. The planning/control aspects of the autonomy system 150 may be configured to make decisions about how the truck 102 should move through the environment to get to its goal or destination. It may consume information from the perception and localization modules to know where it is relative to the surrounding environment and what other objects and traffic actors are doing.

FIG. 1 further illustrates an environment 100 for modifying one or more actions of the truck 102 using the autonomy system 150. The truck 102 is capable of communicatively coupling with a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously. In some implementations, the server 170 may be, or may implement any of the structure or functionality of, the remote server 410*a* described in connection with FIG. 4.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous, having varying degrees of autonomy or autonomous functionality. Further, the various sensors described in connection with the truck 102 may positioned, mounted, or otherwise configured to capture sensor data from the environment surrounding any type of vehicle.

Figure 2:
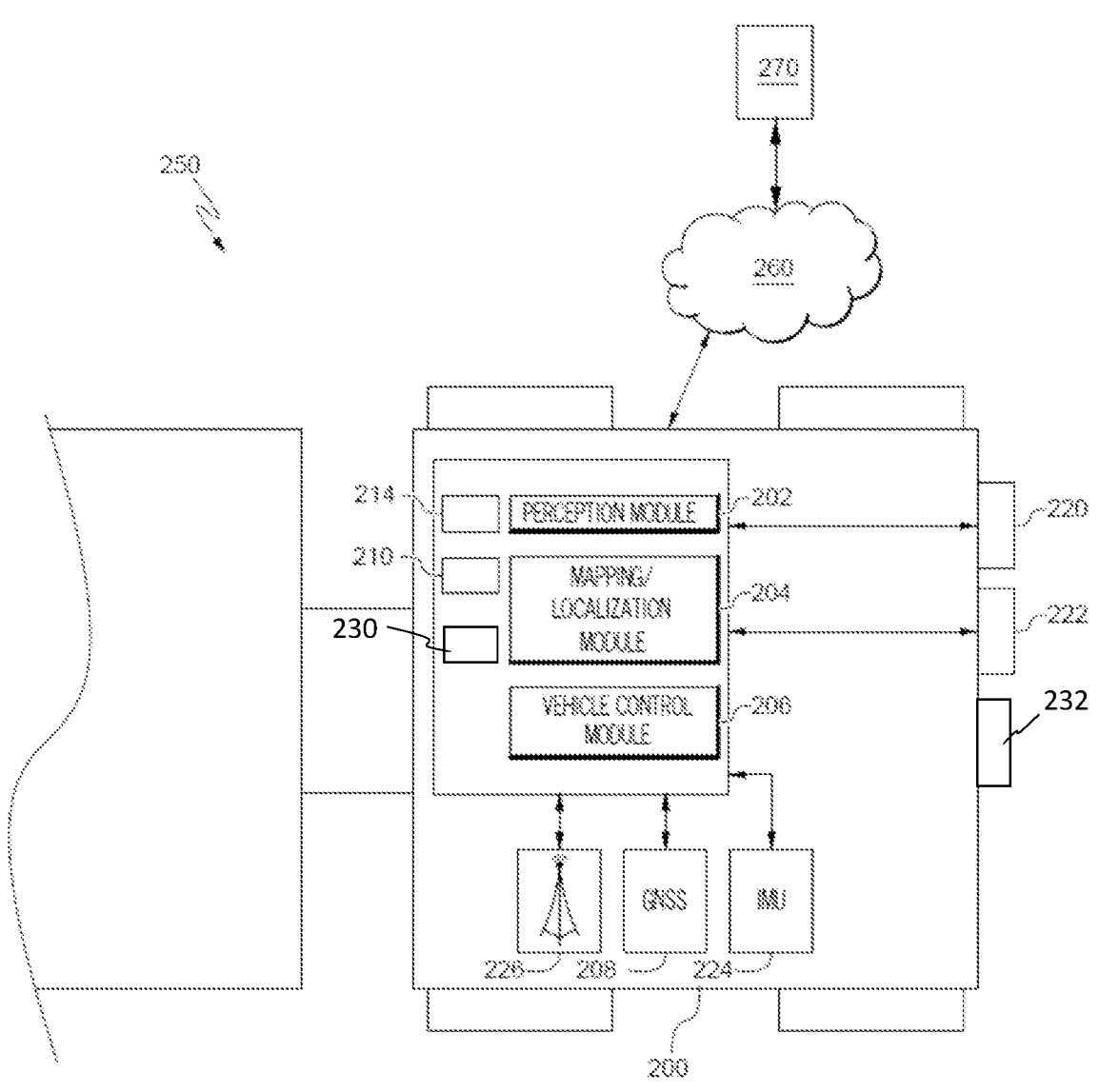
FIG. 2 is a schematic of the autonomy system of the vehicle, according to an embodiment.

With reference to FIG. 2, an autonomy system 250 of a truck 200 (e.g., which may be similar to the truck 102 of FIG. 1) may include a perception system including a camera system 220, a LiDAR system 222, a radar system 232, a GNSS receiver 208, an inertial IMU 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in many ways. As shown in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field-of-view (FOV). The FOV can have any angle or aspect such that images of the areas ahead of, to the side, and behind the truck 102 may be captured. In some embodiments, the FOV may be limited to particular areas around the truck 102 (e.g., ahead of the truck 102) or may surround 360 degrees of the truck 102. In some embodiments, the image data generated by the camera system(s) 220 may be sent to the perception module 202 and stored, for example, in memory 214.

The LiDAR system 222 may include a laser generator and a detector and can send and receive laser rangefinding. The individual laser points can be emitted to and received from any direction such that LiDAR point clouds (or "LiDAR images") of the areas ahead of, to the side, and behind the truck 200 can be captured and stored. In some embodiments, the truck 200 may include multiple LiDAR systems, and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared light to image objects and can be used with a wide variety of targets. In some embodiments, the LiDAR system 222 can be used to map physical features of an object with high resolution (e.g., using a narrow laser beam). In some examples, the LiDAR system 222 may generate a point cloud, and the point cloud may be rendered to visualize the environment surrounding the truck 200 (or object(s) therein). In some embodiments, the point cloud may be rendered as one or more polygon(s) or mesh model(s) through, for example, surface reconstruction. Collectively, the LiDAR system 222 and the camera system 220 may be referred to herein as "imaging systems."

The radar system 232 may estimate strength or effective mass of an object, as objects made of paper or plastic may be weakly detected. The radar system 232 may be based on 24 GHZ, 77 GHz, or other radio wave frequencies. The radar system 232 may include short-range radar (SRR), mid-range radar (MRR), or long-range radar (LRR). One or more sensors may emit radio waves, and a processor can process the received reflected data (e.g., raw radar sensor data).

The global navigation satellite system (GNSS) receiver 208 may be positioned on the truck 200 and may be configured to determine a location of the truck 200 via GNSS data, as described herein. The GNSS receiver 208 may be configured to receive one or more signals from a GNSS (e.g., global positioning system (GPS), etc.) to localize the truck 200 via geolocation. The GNSS receiver 208 may provide an input to and otherwise communicate with the mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The IMU 224 may be an electronic device that measures and reports one or more features regarding the movements of the truck 200. For example, the IMU 224 may measure a velocity, an acceleration, an angular rate, and/or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the truck 200 and predict a location of the truck 200 even when the GNSS receiver 208 cannot receive satellite signals.

The transceiver 226 may be configured to communicate with one or more external networks 260 via, for example, a wired or wireless connection to send and receive information (e.g., to a remote server 270). The wireless connection may be a wireless communication signal (e.g., Wi-Fi, cellular, LTE, 5G, etc.) In some embodiments, the transceiver 226 may be configured to communicate with external network(s) 260 via a wired connection, such as, for example, during initial installation, testing, or servicing of the autonomy system 250 of the truck 200. A wired/wireless connection may be used to download and install various lines of code in the form of digital files (e.g., HD digital maps), executable programs (e.g., navigation programs), and other computer-readable code that may be used by the system 250 to navigate or otherwise operate the truck 200, either fully-autonomously or semi-autonomously. The digital files, executable programs, and other computer readable code may be stored locally or remotely and may be routinely updated (e.g., automatically or manually) or updated on demand via the transceiver 226.

In some embodiments, the truck 200 may not be in constant communication with the network 260, and updates which would otherwise be sent from the network 260 to the truck 200 may be stored at the network 260 until such time as the network connection is restored. In some embodiments, the truck 200 may deploy with all the data and software it needs to complete a mission (e.g., necessary perception, localization, and mission planning data) and may not utilize any connection to network 260 during some of or all of the entire mission. Additionally, the truck 200 may send updates to the network 260 (e.g., regarding unknown or newly detected features in the environment as detected by perception systems) using the transceiver 226. For example, when the truck 200 detects differences between the perceived environment and the features on a digital map, the truck 200 may provide updates to the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. The autonomy system 250 may include a single microprocessor or multiple microprocessors that may include means for identifying and reacting to differences between features in the perceived environment and features of the maps stored on the truck 200. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remotely from the system 250. For example, one or more features of the mapping/localization module 204 could be located remotely from the truck 200. Various other circuit types may be associated with the autonomy system 250, including signal-conditioning circuitry, communication circuitry, actuation circuitry, and other appropriate circuitry.

Figure 4:
FIG. 4 is a schematic of a system for redundant lane detection for autonomous vehicle operation, according to an embodiment.
Figure 4:
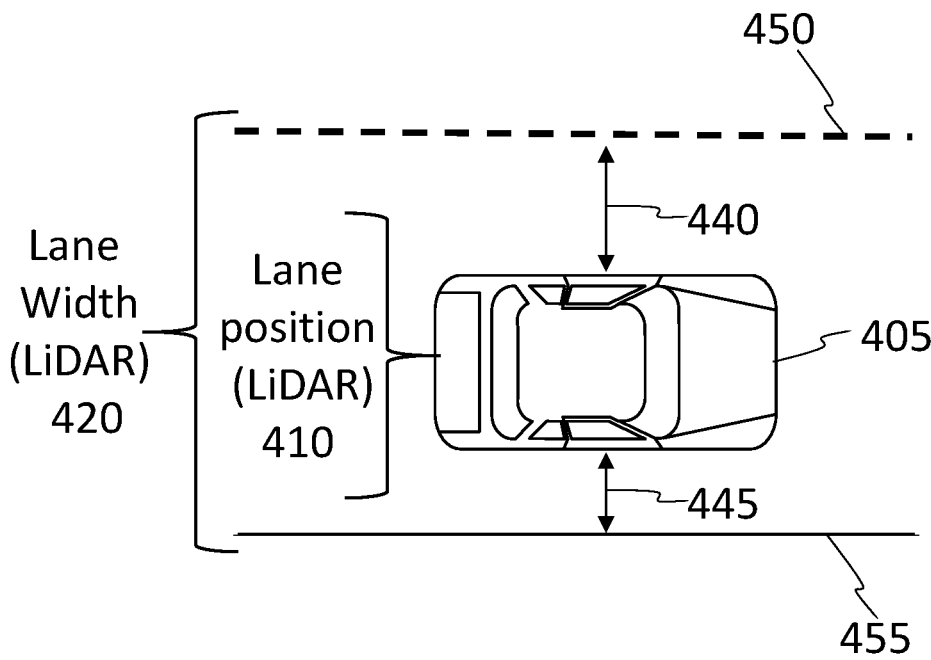

The memory 214 of autonomy system 250 may store data and/or software routines that assists the autonomy system 250 in performing its functions, such as the functions of the perception module 202, the mapping/localization module 204, the vehicle control module 206, a road analysis module 300 of FIG. 3, the functions of the autonomous vehicle 405 of FIG. 4, and the method 500 of FIG. 5. The memory 214 may store one or more of any data described herein relating to digital maps, traffic conditions, and perception data or data generated therefrom. Further, the memory 214 may also store data received from various inputs associated with the autonomy system 250, such as data from the perception system.

As noted above, perception module 202 may receive input from the various sensors, such as camera system 220, LiDAR system 222, GNSS receiver 208, and/or IMU 224, (collectively "perception data") to sense an environment surrounding the truck and interpret it. To interpret the surrounding environment, the perception module 202 (or "perception engine") may identify and classify objects or groups of objects in the environment. For example, the truck 200 may use the perception module 202 to identify one or more objects (e.g., pedestrians, vehicles, debris, road signs, etc.) or features of the roadway 114 (e.g., intersections, lane lines, shoulder lines, geometries of road features, lane types, etc.) near a vehicle and classify the objects in the road. In some embodiments, the perception module 202 may include an image classification function and/or a computer vision function.

The system 150 may collect perception data. The perception data may represent the perceived environment surrounding the vehicle and may be collected using aspects of the perception system described herein. The perception data can come from, for example, one or more of the LiDAR systems 222, the camera system 220, and various other externally facing sensors and systems on board the vehicle (e.g., the GNSS receiver 208, etc.). For example, on vehicles having a sonar or radar system, the sonar and/or radar systems may collect perception data. As the truck 102 travels along the roadway 114, the system 150 may continually receive data from the various systems on the truck 102. In some embodiments, the system 150 may receive data periodically and/or continuously.

With respect to FIG. 1, the truck 102 may collect perception data that indicates a presence of the lane lines 116, 118, 120. The perception data may indicate the presence of a line defining a shoulder of the road. Features perceived by the vehicle should track with one or more features stored in a digital map (e.g., in the mapping/localization module 204) of a world model, as described herein. Indeed, with respect to FIG. 1, the lane lines that are detected before the truck 102 is capable of detecting the bend 128 in the road (that is, the lane lines that are detected and correlated with a known, mapped feature) will generally match with features in the stored map of the world model and the vehicle will continue to operate in a normal fashion (e.g., driving forward in the left lane of the roadway or per other local road rules). However, in the depicted scenario, the vehicle approaches a new bend 128 in the road that is not stored in locally stored map data because the lane lines 116, 118, 120 have shifted right from their original positions 122, 124, 126.

The system 150 may compare the collected perception data with the stored digital map data to identify errors (e.g., geometric errors or semantic errors) in the stored map data. The example above, in which lanes lines have shifted from an expected geometry to a new geometry, is an example of a geometric error in the map data. To identify errors in the map data, the system may identify and classify various features detected in the collected perception data from the environment with the features stored in the map data, including digital map data representing features proximate to the truck 102. For example, the detection systems may detect the lane lines 116, 118, 120 and may compare the geometry of detected lane lines with a corresponding expected geometry of lane lines stored in the digital map. Additionally, the detection systems could detect the road signs 132a. 132b and the landmark 134 to compare such features with corresponding semantic features in the digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 150 interacts with the various features. Based on the comparison of the detected features with the features stored in the digital map(s), the system 150 may generate a confidence level, which may represent a confidence of the vehicle in its location with respect to the features on a digital map and hence, its actual location. Additionally, and as described in further detail herein, the system 150 may transmit corrections or errors detected from the digital map to one or more servers, which can correct any inaccuracies or errors detected from the perception data.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters to classify portions, features, or attributes of an image. The image classification function may be embodied by a software module that may be communicatively coupled to a repository of images or image data (e.g., visual data and/or point cloud data) which may be used to detect and classify objects, road features, and/or features in real time image data captured by, for example, the camera system 220 and/or the LiDAR system 222. In some embodiments, the image classification function may be configured to detect and classify features based on information received from only a portion of the multiple available sources. For example, in the case that captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. Objects or road features detected via the computer vision function may include, but are not limited to, road signs (e.g., speed limit signs, stop signs, yield signs, informational signs, traffic signals such as traffic lights, signs, or signals that direct traffic such as right turn-only or no-right turn signs, etc.), obstacles, other vehicles, lane lines, lane widths, shoulder locations, shoulder width, or construction-related objects (e.g., cones, construction signs, construction-related obstacles, etc.), among others.

The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.). The computer vision function may be embodied by a software module that may be communicatively coupled to a repository of images or image data (e.g., visual data and/or point cloud data), and may additionally implement the functionality of the image classification function. Objects detected in the environment surrounding the truck 200 may include other vehicles traveling on the road. Traffic conditions of the road upon which the truck 200 is traveling or adjacent roads can be determined based on an expected speed (e.g., a speed limit within predetermined tolerance range(s), etc.) of other vehicles (and the truck 200) and the current speed of the vehicles on the roadway. If the actual speed of vehicles on the road is less than the expected speed, it may be determined that there is traffic congestion on the roadway.

Mapping/localization module 204 receives perception data that can be compared to one or more digital maps stored in the mapping/localization module 204 to determine where the truck 200 is in the world and/or or where the truck 200 is on the digital map(s) when, for example, generating a world model for the environment surrounding the truck 200. In particular, the mapping/localization module 204 may receive perception data from the perception module 202 and/or from the various sensors sensing the environment surrounding the truck 200 and may correlate features of the sensed environment with details (e.g., digital representations of the features of the sensed environment) on the digital maps. The digital map may have various levels of detail and can be, for example, a raster map, a vector map, or the like. The digital maps may be stored locally on the truck 200 and/or stored and accessed remotely. In at least one embodiment, the truck 200 deploys with sufficiently stored information in one or more digital map files to complete a mission without connecting to an external network during the mission.

A centralized mapping system may be accessible via network 260 for updating the digital map(s) of the mapping/localization module 204, which may be performed, for example, based on corrections to the world model generated according to the techniques described herein. The digital map may be built through repeated observations of the operating environment using the truck 200 and/or trucks or other vehicles with similar functionality. For instance, the truck 200, a specialized mapping vehicle, a standard autonomous vehicle, or another vehicle can run a route several times and collect the location of all targeted map features relative to the position of the vehicle conducting the map generation and correlation.

The vehicle control module 206 may control the behavior and maneuvers of the truck 200. For example, once the systems on the truck 200 have determined its location with respect to stored map features (e.g., intersections, road signs, lane lines, etc.), the truck 200 may use the vehicle control module 206 and its associated systems to plan and execute maneuvers and/or routes with respect to the features of the environment. The vehicle control module 206 may make decisions about how the truck 200 will move through the environment to reach its goal or destination to complete its mission. The vehicle control module 206 may consume information from the perception module 202 and the maps/localization module 204 to know where it is relative to the surrounding environment and what other traffic actors are doing. Mission control data may include route information, which defines one or more destinations to which the autonomous vehicle is to travel to complete the route. The route may include a path within the map data that indicates which roads the vehicle can utilize to reach the destination(s) in the route. Mission control data, including routes, may be received from or queried by one or more servers via the network 260.

The vehicle control module 206 may be communicatively and operatively coupled to a plurality of vehicle operating systems and may execute one or more control signals and/or schemes to control operation of the one or more operating systems; for example, the vehicle control module 206 may control one or more of a vehicle steering system, a propulsion system, and/or a braking system. The propulsion system may be configured to provide powered motion for the truck and may include, for example, an engine/motor, an energy source, a transmission, and wheels/tires. The propulsion system may be coupled to and receive a signal from a throttle system, for example, which may be any combination of mechanisms configured to control the operating speed and acceleration of the engine/motor and, thus, the speed/acceleration of the truck. The steering system may be any combination of mechanisms configured to adjust the heading or direction of the truck. The brake system may be, for example, any combination of mechanisms configured to decelerate the truck (e.g., friction braking system, regenerative braking system, etc.).

The vehicle control module 206 may be configured to avoid obstacles in the environment surrounding the truck and use one or more system inputs to identify, evaluate, and modify a vehicle trajectory. The vehicle control module 206 is depicted as a single module but can be any combination of software agents and/or hardware modules capable of generating vehicle control signals operative to monitor systems and controlling various vehicle actuators. The vehicle control module 206 may include a steering controller for vehicle lateral motion control and a propulsion and braking controller for vehicle longitudinal motion. The vehicle control module 206 can control the truck 200 according to a predetermined route, which may be stored as part of a route information in the memory 214 of the system 250.

In an embodiment, road analysis module 230 executes one or more artificial intelligence models to predict one or more attributes (e.g., class, speed, etc.) of detected target objects (e.g., other autonomous vehicles, or construction-related features such as cones, closed lanes, traffic congestion or traffic jams). The artificial intelligence model(s) may be configured to ingest data from at least one sensor of the autonomous vehicle and predict the attributes of the object. In an embodiment, the artificial intelligence module is configured to predict a plurality of predetermined attributes of each of one or more target objects relative to the autonomous vehicle. The predetermined attributes may include a relative velocity of the respective target object relative to the autonomous vehicle and an effective mass attribute of the respective target object.

In an embodiment, the artificial intelligence model is a predictive machine learning model that may be continuously trained using updated data, e.g., relative velocity data, mass attribute data, target object classification data, and road feature data. In various embodiments, the artificial intelligence model(s) may be predictive machine learning models that are trained to determine or otherwise generate predictions relating to road geometry. For example, the artificial intelligence model(s) may be trained to output predictions of lane width, relative lane position within the road, the number of lanes in the road, whether the lanes or road bend and to what degree the lanes or road bend, to predict the presence of intersections in the road, or to predict the characteristics of the shoulder of the road (e.g., presence, width, location, distance from lanes or vehicle, etc.). In various embodiments, the artificial intelligence model may employ any class of algorithms that are used to understand relative factors contributing to an outcome, estimate unknown outcomes, discover trends, and/or make other estimations based on a data set of factors collected across prior trials. In an embodiment, the artificial intelligence model may refer to methods such as logistic regression, decision trees, neural networks, linear models, and/or Bayesian models.

FIG. 3 shows a road analysis module 300 of system 150, 250. The road condition analysis module 300 includes velocity estimator 310, effective mass estimator 320, object visual parameters component 330, target object classification component 340, and the artificial intelligence models 350. These components of road analysis module 300 may be either or both software-based components and hardware-based components.

Velocity estimator 310 may determine the relative velocity of target objects relative to the ego vehicle. Effective mass estimator 320 may estimate effective mass of target objects, for example, based on object visual parameters signals from object visual parameters component 330 and object classification signals from target object classification component 340. Object visual parameters component 330 may determine visual parameters of a target object such as size, shape, visual cues, and other visual features in response to visual sensor signals and generate an object visual parameters signal. By comparing the velocity of target objects in the environment to an expected velocity associated with the road (e.g., a speed limit), the road condition analysis module 300 can detect the presence of traffic congestion or a traffic jam proximate to the ego vehicle.

Target object classification component 340 may determine a classification of a target object using information contained within the object visual parameters signal, which may be correlated to various objects and generate an object classification signal. For instance, the target object classification component 340 can determine whether the target object is a plastic traffic cone, an animal, a road sign, or another type of traffic-related or road-related feature. Target objects may include moving objects, such as other vehicles, pedestrians, and cyclists in the proximal driving area. Target objects may include fixed objects such as obstacles; infrastructure objects such as rigid poles, guardrails, or other traffic barriers; and parked cars. Fixed objects, also herein referred to herein as static objects and non-moving objects, can be infrastructure objects as well as temporarily static objects such as parked cars, construction equipment, or temporarily closed lanes.

The target object classification component 340 can determine additional characteristics of the road, including but not limited to characteristics of signs (e.g., speed limit signs, stop signs, yield signs, informational signs, signs or signs that direct traffic such as right-only or no-right turn signs, etc.), traffic signals such as traffic lights, as well as geometric information relating to the road. The target object classification component 340 can execute artificial intelligence models, for example, which receive sensor data (e.g., perception data as described herein, pre-processed sensor data, etc.) as input and generate corresponding outputs relating to potential traffic conditions indicated in the sensor data.

The sensor data may include, in one example, a speed of the ego vehicle, the expected speed of the roadway upon which the ego vehicle is traveling, and predicted velocity values of other vehicles traveling on the same road as the ego vehicle. In some implementations, only perception data (e.g., one or more images, sequences of images, LiDAR data, radar data, etc.) may be provided as input to the artificial intelligence models. The artificial intelligence models may be trained to output a classification of a traffic condition proximate to the ego vehicle, such as the presence of a traffic jam, traffic congestion, or an absence of traffic.

Externally facing sensors may provide system 150, 250 with data defining distances between the ego vehicle and target objects or road features in the vicinity of the ego vehicle and with data defining direction of target objects from the ego vehicle. Such distances can be defined as distances from sensors, or sensors can process the data to generate distances from the center of mass or other portion of the ego vehicle. The externally facing sensors may provide system 150, 250 with data relating to lanes of a multi-lane roadway upon which the ego vehicle is operating. The lane information can include indications of target objects (e.g., other vehicles, obstacles, etc.) within lanes, lane geometry (e.g., number of lanes, whether lanes are narrowing or ending, whether the roadway is expanding into additional lanes, etc.), or information relating to objects adjacent to the lanes of the roadway (e.g., an object or vehicle on the shoulder, on on-ramps or off-ramps, etc.).

In an embodiment, the system 150, 250 collects data relating to target objects or road features within a predetermined region of interest (ROI) in proximity to the ego vehicle. Objects within the ROI may satisfy predetermined criteria for distance from the ego vehicle. The ROI may be defined with reference to parameters of the vehicle control module 206 in planning and executing maneuvers and/or routes with respect to the features of the environment. In an embodiment, there may be more than one ROI in different states of the system 150, 250 in planning and executing maneuvers and/or routes with respect to the features of the environment, such as a narrower ROI and a broader ROI. For example, the ROI may incorporate data from a lane detection algorithm and may include locations within a lane. The ROI may include locations that may enter the ego vehicle's drive path in the event of crossing lanes, accessing a road junction, making swerve maneuvers, or other maneuvers or routes of the ego vehicle. For example, the ROI may include other lanes travelling in the same direction, lanes of opposing traffic, edges of a roadway, road junctions, and other road locations in collision proximity to the ego vehicle.

In an embodiment, the system 150, 250 can generate a high-definition (HD) map, at least portions of which may be incorporated into a world model used by the autonomous vehicle to navigate. The system 150, 250 may generate an HD map by utilizing various data sources and advanced algorithms. The data sources may include information from onboard sensors, such as cameras, LiDAR, and radar, as well as data from external sources, such as satellite imagery and information from other vehicles. The system 150, 250 may collect and process the data from these various sources to create a high-precision representation of the road network. The system 150, 250 may use computer vision techniques, such as structure from motion, to process the data from onboard sensors and create a 3D model of the environment. This model may then be combined with the data from external sources to create a comprehensive view of the road network.

The system 150, 250 may also apply advanced algorithms to the data, such as machine learning and probabilistic methods, to improve the detail of the road network map. The algorithms may identify features, such as lane markings, road signs, traffic lights, and other landmarks, and label them accordingly. The resulting map may then be stored in a format that can be easily accessed and used by the components of the ego vehicle. The system 150, 250 may use real-time updates from the vehicle's onboard sensors to continuously update the HD map data as the vehicle moves, as described herein. This enables the vehicle to maintain an up-to-date representation of its surroundings and respond to changing conditions in real-time or near real-time.

The road analysis module 300 may execute any number of artificial intelligence models 350 to perform the various redundant lane detection techniques described herein. The artificial intelligence models 350 may include any number and type of machine-learning model, including but not limited to logistic regression models, decision tree models, neural network models (e.g., deep neural networks (DNNs), convolutional neural networks (CNNs), recurrent neural networks, long short-term memory (LSTM) networks, transformer networks, etc.), linear models, and/or Bayesian models, among others. The artificial intelligence models 350 may be trained using any suitable training technique, such as gradient descent or other optimization algorithms, supervised learning, semi-supervised learning, self-supervised learning, unsupervised learning, or combinations thereof. The artificial intelligence models 350 are shown as including a left lane distance model 360, a right lane distance model 365, a lane offset model 370, a lane width model 375, and one or more segmentation models 380.

The artificial intelligence models 350 may include several models each trained to detect a particular feature of the road. For example, when the ago the artificial intelligence models 350 may include models (e.g., neural network models, regression models, etc.) trained to detect a distance between the ego vehicle and a right lane line or left lane line of the lane in which the ego vehicle is traveling. Furthering this example, one of artificial intelligence models 350 that is trained to predict the distance to the left lane line is referred to as a left lane distance model 360, and another of the artificial intelligence models 350 that is trained to predict the distance to the right lane line is referred to as a right lane distance model 365. In an embodiment, the left lane distance model 360 and the right lane distance model 365 may have a similar or identical architecture (e.g., number and type of layers), but may be trained to generate different values (e.g., using different ground truth data).

Each of the left lane distance model 360 and the right lane distance model 365 may receive corresponding image data as input. For example, the left lane line distance model may receive images captured from the left-hand side of the ego vehicle, and the right lane line distance model may receive images captured from the right-hand side of the ego vehicle. Each of the left lane distance model 360 and the right lane distance model 365 may include one or more feature extraction layers, which may include convolutional layers or other types of neural network layers (e.g., pooling layers, activation layers, normalization layers, etc.). Each the left lane distance model 360 and the right lane distance model 365 can include one or more output layers (e.g., fully connected layers, etc.) that can output a corresponding distance from the left lane line or the right lane line, depending on the model.

Each of the left lane distance model 360 and the right lane distance model 365 can be trained to receive image data or LiDAR data as input and generate a corresponding lane distance value as output. The image data can include any type of image data described herein, including the LiDAR data captured via the sensors of the ego vehicle (e.g., LiDAR images or point clouds, etc.), or images or video frames captured by cameras of the autonomous vehicle. Each of the left lane distance model 360 and the right lane distance model 365 may be trained by one or more computing systems or servers, such as the server 170 or the remote server 270.

For example, the left lane distance model 360 and the right lane distance model 365 may be trained using supervised, semi-supervised, self-supervised, and/or unsupervised training techniques. For example, using a supervised learning approach, the left lane distance model 360 and the right lane distance model 365 may be trained using providing training data and labels corresponding to the training data (e.g., as ground truth). The training data may include a respective label for each of left lane distance model 360 and the right lane distance model 365 for a given input image. In one embodiment, during training, both the left lane distance model 360 and the right lane distance model 365 may be provided with the same input data and may be trained using different and respective labels. In another embodiment, during training, both the left lane distance model 360 and the right lane distance model 365 may be provided with different input data (e.g., images from a respective side of the ego vehicle to which the model corresponds).

Each of the left lane distance model 360 and the right lane distance model 365 of the artificial intelligence models 350 can then be executed by the road analysis module 300 using data sensor data captured by the sensors of the ego vehicle as the ego vehicle operates on a road. The road analysis module 300 can execute each of the left lane distance model 360 and the right lane distance model 365 by propagating the input data through the left lane distance model 360 and the right lane distance model 365 to generate a left lane distance value and a right lane distance value. The left lane distance value can represent the distance from the ego vehicle to the left lane line of the lane in which the ego vehicle is traveling, and the right lane distance value can represent the distance from the ego vehicle to the right lane line of the lane in which the ego vehicle is traveling relative to the rightmost lane.

The road analysis module 300 may execute additional artificial intelligence models 300 sequentially or in parallel with the left lane distance model and the right lane distance model to generate redundant data relating to the position of the ego vehicle within a lane. For example, the artificial intelligence models 350 may include a lane offset model 370. The lane offset model 370 may be trained to receive various sensor data (e.g., one or more of LiDAR data, image data, IMU data, etc.) as input and generate a lane offset as output. The lane offset may be a unidimensional distance from a feature of the vehicle (e.g., a longitudinal centerline of the ego vehicle) to a visible and distinguishable feature of the road (e.g., a center of the lane, a right center lane marker, etc.). The lane offset may be measured in any distance unit (e.g., feet, meters, etc.) and may be expressed as an absolute value or as a difference from centerline or some other reference point associated with the lane (e.g., "+/−0.2 meters from the center of the lane").

The lane offset model 370 may be any type of machine learning model, including any type of neural network or regression model. The lane offset model 370 may be trained to receive LiDAR or image data as input and generate a lane offset value as output. The lane offset model 370 may be trained using supervised learning, semi-supervised learning, self-supervised learning, or unsupervised learning, among other techniques. In an example supervised learning approach, the ground truth lane offset may be included in a training dataset as labeled image data or LiDAR data.

The lane offset model 370 may be trained using complementary data to the data used to train the left lane distance model 360 and the right lane distance model 365. For example, if the left lane distance model 360 and the right lane distance model 365 were trained to receive image data as input (e.g., from left and right cameras), the lane offset model 370 may be trained to receive LiDAR data as input. The complementary nature of the model's input data enables the redundant lane detection techniques described herein to operate robustly in a variety of different environments and conditions. For example, models trained using LiDAR data excel in making predictions using accumulated previous data (e.g., behind the ego vehicle), while models trained using camera data excel in perceiving potential future data (e.g., in front of or proximate to the ego vehicle). The LiDAR sensors of the ego vehicle operate better in wash-out light conditions, while cameras may provide more accurate input data when roads are wet, snowy, or subjected to other types of weather conditions. The road analysis module 300 may execute the lane offset model 370 using LiDAR data or camera data captured by the sensors of the ego vehicle to generate corresponding lane offset values that may be utilized in connection with the redundant lane position calculations described herein.

The artificial intelligence models 350 may include a lane width model 375. The lane width model 375 may be trained to receive sensor data as input (e.g., LiDAR data, image data, video data, etc.) and generate a prediction of the width of the lane in which the ego vehicle is traveling as output. The lane width may be a unidimensional distance from a left lane line of the lane and the right lane line of the lane in which the ego vehicle is traveling. The lane width may be measured in any distance unit (e.g., fect, meters, etc.) and may be expressed as an absolute value.

The lane width model 375 may be any type of machine learning model, including any type of neural network or regression model. The lane width model 375 may be trained to receive LiDAR or image data as input and generate a lane width value as output. The lane width model 375 may be trained using supervised learning, semi-supervised learning, self-supervised learning, or unsupervised learning, among other techniques. In an example supervised learning approach, the ground truth lane offset may be included in a training dataset as labeled image data or LiDAR data.

The lane width model 375 may be trained by one or more servers (e.g., the server 170, the remote server 270), and subsequently provided to the ego vehicle for execution by the road analysis module 300. In an example where supervised learning is used to train the lane width model 375, ground truth data (e.g., known lane widths) may be associated with images or LiDAR data of corresponding roads in a training set. The training set may be provided as input to the lane width model 375, and a loss can be calculated based on a difference between the expected value of the lane width model 375 (e.g., the ground truth data) and the corresponding input data (e.g., image data, LiDAR data, combinations thereof, etc.). The trainable parameters of the lane width model 375 may be updated using an optimization algorithm (e.g., Adam, gradient descent, etc.) to minimize the loss across several training iterations.

As described in connection with the lane offset model 370, the lane width model 375 may be trained using data that is complementary to the data used to train the left lane distance model 360 and the right land distance model 365, and/or the lane offset model 370. The road analysis module 300 may execute the lane width model 375 using LiDAR data or camera data captured by the sensors of the ego vehicle to generate corresponding lane width values that may be utilized in connection with the redundant lane position calculations described herein.

The artificial intelligence models 350 can include one or more segmentation models 380. The segmentation models 380 may include a segmentation model that is trained to segment LiDAR data to detect one or more lane lines, and another segmentation model that is trained to segment image data to detect one or more lane lines. The segmentation models 380 may include computer-executable instructions to perform any type of segmentation suitable for detecting lane lines, such as thresholding, edge detection (e.g., a Canny edge detector), watershed, grab cut, CNNs, or other types of neural networks or machine-learning models.

The segmentation models 380 may be executed to perform semantic segmentation, in which some or all portions of the input data are classified into one or more categories (e.g., a road class, a left lane line class, a right lane line class, etc.). To perform semantic segmentation of the road, the segmentation models 380 may include deep learning neural networks such as CNNs that receive image data or LiDAR data as input. In some implementations, the road analysis module 300 may execute one segmentation model 380 that is trained to receive and segment LiDAR data, and another segmentation model 380 that is trained to receive and segment image data, either in parallel or sequentially as the ego vehicle operates on a roadway. The results of segmentation may be utilized to determine the position of the autonomous vehicle in the lane, and/or to predict the position of future lane lanes, for use in the redundant lane detection techniques described herein.

FIG. 4 illustrates components a system 400 for redundant lane detection during autonomous vehicle operation, according to an embodiment. As shown, the system 400 includes an autonomous vehicle 405, which may execute any of the components described in connection with FIG. 3 (e.g., the road analysis module, velocity estimator 310, effective mass estimator 320, object visual parameters component 330, target object classification component 340, and the artificial intelligence models 350) to perform redundant lane detection.

The autonomous vehicles 405 may be similar to, and include any of the structure and functionality of, the autonomous truck 102 of FIG. 1 or the truck 200 of FIG. 2. As described herein, the autonomous vehicles 405 may include various sensors, including but not limited to LIDAR sensors, cameras (e.g., red-green-blue (RGB) cameras, infrared cameras, three-dimensional (3D) cameras, etc.), and IMUs, among others. The sensors of the autonomous vehicles 405 may be processed using various artificial intelligence model(s) executed by the autonomous vehicles 405 to perform redundant lane line detection and processing.

In the example system 400, the autonomous vehicle 405 is shown as traveling in the right lane of the road 435. As the autonomous vehicle 405 operates on the road 435, various computing system(s) of the autonomous vehicle 405 may execute artificial intelligence models (e.g., the artificial intelligence models 350) to predict various attributes of the lane lines of the lane in which the autonomous vehicle 405 is traveling. For example, the autonomous vehicle 405 may execute a left lane distance model (e.g., the left lane distance model 360) using camera data (e.g., images, video, etc.) as input to calculate the distance 440 from the autonomous vehicle 405 to the left lane line 450. Additionally, the autonomous vehicle 405 may execute a right lane distance model (e.g., the right lane distance model 365) using camera data (e.g., images, video, etc.) as input to calculate the distance 445 from the autonomous vehicle 405 to the right lane line 455. The camera data input to the left lane line model may include images depicting the left side of the autonomous vehicle 405, while the camera data input to the right lane line model may include images depicting the right side of the autonomous vehicle 405.

The autonomous vehicle 405 may further execute one or more artificial intelligence models using complementary input data, such as LiDAR data. In the example system 400, the autonomous vehicle 405 executes a line offset model (e.g., the lane offset model 370) trained to receive LiDAR data as input and generate the lane position 410 as output. The lane position can be an estimated position of a center, longitudinal axis of the autonomous vehicle 405 from one of the left lane line 450 or the right lane line 455. In some implementations, the lane position 410 may be a relative value showing the distance of the center, longitudinal axis of the autonomous vehicle 405 from the estimated center of the lane. Also shown in the example system 400 is the calculation of the lane width 420 using LiDAR data as input. In this example, the autonomous vehicle 405 can execute a lane width model (e.g., the lane width model 375) that is trained to generate a predicted lane width 420 using LiDAR data as input. These various artificial intelligence models may be executed by the autonomous vehicle 405 in real-time or near real-time as the autonomous vehicle 405 operates and captures sensor data.

Executing several, task-specific artificial intelligence models using different input data has a number of advantages. One advantage is that multiple signals generated using different input data, allows for multi-redundant reconstruction features of the lane in which the autonomous vehicle 405 is traveling. Additionally, using redundant lane detection techniques from a variety of sensor data limits the overall potential for occlusion, while still supporting periods of occlusion and frequent gaps or errors in segmented output. For example, the redundant lane detection techniques may still operate in the event of curves or missing paint. One other advantage is that smaller, task-specific artificial intelligence allow for faster computation compared to full segmentation-based approaches, while still resulting in sufficient accuracy to navigate the autonomous vehicle.

The autonomous vehicle 405 can execute the artificial intelligence models described herein to generate the prediction of lane width 420, the prediction of lane position 410 (sometimes referred to as lane offset), the predicted distance from the left lane line 440, and the predicted distance from the right lane line 445, which may be utilized to generate a confidence value in the position of the autonomous vehicle in the lane. To calculate the confidence value, the autonomous vehicle 405 can perform the operations of the method 500 of FIG. 5. The confidence value can be utilized to identify the most accurate prediction of the position of the autonomous vehicle 405 in the lane of the road 435, and to navigate the autonomous vehicle 405 within the lane.

FIG. 5 is a flow diagram of an example method 500 of redundant lane detection for autonomous vehicle operation, according to an embodiment. The steps of the method 500 of FIG. 5 may be executed, for example, by an autonomous vehicle system, including the autonomous vehicle 405, the system 150, or the system 250, according to some embodiments. The method 500 shown in FIG. 5 comprises execution steps 510-550. However, it should be appreciated that other embodiments may comprise additional or alternative execution steps or may omit one or more steps altogether. It should also be appreciated that other embodiments may perform certain execution steps in a different order. Steps discussed herein may also be performed simultaneously or near-simultaneously with one another.

The method 500 of FIG. 5 is described as being performed by an autonomous vehicle system (e.g., the autonomous vehicle 405, the system 150, the system 250, the road analysis module 300, etc.). However, in some embodiments, one or more of the steps may be performed by different processor(s) or any other computing device. For instance, one or more of the steps may be performed via a cloud-based service (e.g., one or more servers), or another processor in communication with the processor of the autonomous vehicle and/or its autonomy system. Although the steps are shown in FIG. 5 as having a particular order, it is intended that the steps may be performed in any order. It is also intended that some of these steps may be optional.

At step 510 of the method 500, the autonomous vehicle system (e.g., the autonomous vehicle 405, the system 150, the system 250, the road analysis module 300, etc.) of an autonomous vehicle can receive first sensor data from a first sensor of the autonomous vehicle and second sensor data from a second sensor of the autonomous vehicle. In some implementations, the first sensor data includes LiDAR data and the second sensor data comprises image data, each of which may be captured by sensors mounted on the autonomous vehicle. The sensor data can be captured during operation of the autonomous vehicle. The cameras may include RGB cameras, infrared cameras, three-dimensional (3D) cameras, among others. The sensor data may be received in response to polling requests automatically transmitted to the sensors or may be captured and stored in one or more data structures.

The image data may depict regions of interest in front of or surrounding the autonomous vehicle. In some implementations, images may be captured for different regions surrounding the autonomous vehicle. For example, one camera may capture the environment to the left of the autonomous vehicle, another camera mat capture the environment to the right of the autonomous vehicle, and yet another camera (or set of cameras) may capture the environment in front or behind the autonomous vehicle, among other regions of interest. The sensor data may include LiDAR data, which may include LiDAR point clouds (or LiDAR images) of the areas ahead of, to the side, and behind the autonomous vehicle. The sensor data of the autonomous vehicle can be stored in memory and utilized to generate and update a world model, as described herein. The various sensor data captured by the sensors of the autonomous vehicle can depict or otherwise indicate the presence of road features, including lane lanes, shoulder lines, or other features that may be utilized to determine the location of the autonomous vehicle on the road.

At step 520 of the method 500, the autonomous vehicle system can generate, based on the first sensor data, a first prediction of a dimension of a lane of a road. In one example, the first sensor data may include LiDAR data. The LiDAR data may be captured by one or more LiDAR sensors in step 510 while the autonomous vehicle operates in a lane of the road. The LiDAR data can be provided as input to one or more artificial intelligence models (e.g., the artificial intelligence models 350) to generate the first prediction of the dimension of the road. The dimension of the road may be, for example, a width of the road. In some implementations, the autonomous vehicle system can provide the first sensor data as input to a regression model that is trained to generate a prediction of the width of the road (e.g., the lane width model 375 of FIG. 3, etc.).

Additional artificial intelligence models may also be executed by the autonomous vehicle system using the first sensor data to predict other features of the road. For example, the autonomous vehicle system may provide the first sensor data, which may include LiDAR data, as input to an artificial intelligence model that predicts a lane offset of the autonomous vehicle. As described herein, the lane offset may be a unidimensional distance from a feature of the vehicle (e.g., a longitudinal centerline of the autonomous vehicle) to a visible and distinguishable feature of the road (e.g., a center of the lane, a right center lane marker, etc.). To do so, the autonomous vehicle may provide the first sensor data or the second sensor data as input to a lane offset model (e.g., the lane offset model 370), which is trained to receive LiDAR data or image data as input and generate a prediction of the lane offset of the autonomous vehicle as output.

In some implementations, the autonomous vehicle system can execute multiple of the same type of artificial intelligence model that are trained to generate the same output based on different input sensor data. For example, to generate the prediction of the lane offset of the autonomous vehicle, the autonomous vehicle system can execute a first lane offset model trained to receive LiDAR data as input and a second lane offset model trained to receive image data (e.g., from a rear camera, a front camera, etc.) as input. Each of the first and second lane offset models may be trained to generate corresponding predictions of the lane offset for the autonomous vehicle. To calculate the final lane offset value that may be utilized in further processing steps, the autonomous vehicle system may average the predictions of lane offset produced by each model.

At step 530 of the method 500, the autonomous vehicle system can generate, based on the second sensor data, a second prediction of a position of the autonomous vehicle within the lane of the road. To do so, the autonomous vehicle system may perform similar operations as described in connection with step 520. The second sensor data may be complementary to the first sensor data provided as input to the artificial intelligence models step 520. For example, if LiDAR data was utilized as the first sensor data in step 520 to execute the artificial intelligence model(s), image data may be utilized as the second sensor data to execute additional artificial intelligence model(s) to predict the position of the autonomous vehicle within the lane of the road, and vice versa.

The position of the autonomous vehicle in the lane of the road may be generated in part based on the output of a left lane distance model (e.g., the left lane distance model 360) and/or a right lane distance model (e.g., the right lane distance model 365). For example, the position of the autonomous vehicle in the lane may be a predicted distance from the right lane line, or a predicted distance from the left lane line (which may be utilized to determine a lane offset, or to verify the accuracy of the output of the lane offset model). In such implementations, the second artificial intelligence model may include a neural network or a regression model that receives image data as input. For example, the left lane distance model may be trained to receive images of the environment on the left-hand side of the autonomous vehicle as input, and the right lane distance model may be trained to receive images of the environment on the right-hand side of the autonomous vehicle as input.

In some implementations, the predicted distance from the left lane line and the distance of the right lane line can be utilized to predict a distance from a center of the lane. Additionally or alternatively, the autonomous vehicle system may provide the second sensor data as input to a lane offset model (e.g., the lane offset model 370), which may be trained to receive the second sensor data as input and generate a prediction of a distance of the autonomous vehicle from a center of the lane. In one example, the image data provided as input to the lane offset model may be captured by a camera that has a field-of-view covering the environment in front of the autonomous vehicle or behind the autonomous vehicle.

At step 540 of the method 500, the autonomous vehicle system can determine a confidence value for the second prediction of the position of the autonomous vehicle within the lane of the road based on the first prediction and the second prediction. The confidence value can be a value that represents a degree to which the predicted position of the autonomous vehicle is accurate. To determine whether the prediction is accurate, the autonomous vehicle system can determine whether the predictions of other features of the lane, such as the distance between the autonomous vehicle and the left and right lane lines, the width of the lane, and/or the lane offset of the autonomous vehicle agree with the prediction of the position of the autonomous vehicle in the lane.

As described herein, the first prediction, the second prediction, and any other predictions, may be generated via discrete task-specific artificial intelligence models that utilize complementary sensor data (e.g., both LiDAR and image data) captured during autonomous vehicle operation as input. In an example where the position of the autonomous vehicle is the distance from the left or right lane line, the autonomous vehicle system can generate the confidence by comparing the width of the lane predicted in step 520 to the sum of the distance to the left lane line and the distance to the right lane line. Furthering this example, the width of the lane may be predicted as being five meters using a first artificial intelligence model that receives LiDAR data as input, while the left and right lane distances may be predicted using second artificial intelligence models trained to receive image data as input. In this example, a relatively large confidence value would be generated if the left lane line distance prediction was two meters and the right lane line distance prediction was three meters, because the sum (five meters) is equal to the prediction of the lane width (also five meters).

In the above example, to determine the confidence value, the autonomous vehicle system can compare the predicted width to the sum of the distances, and generate the confidence value to be proportional to the degree that the two values are similar. For example, the confidence value for the position of the autonomous vehicle may be a scalar value ranging from zero (lowest confidence) to one (highest confidence). The closer the two values match the closer the confidence value is to one, and the more the two values differ, the closer the confidence value is to zero.

The confidence value for the prediction of the position of the autonomous vehicle in the lane may also be calculated based on the lane offset. In this example, the sum of one of the predicted left or right lane distance and the predicted lane offset may be compared to the other of the predicted left or right lane distance. For example, if the lane offset indicates the autonomous vehicle is one meter to the left of center, and the predicted left lane line distance is two meters, then the predicted right lane line distance should be equal to three meters. Furthering this example, the autonomous vehicle system can compare the sum of the lane offset and the predicted left lane line distance to the predicted right lane line distance to determine the confidence value (e.g., a high confidence value if they are about equal, a lower confidence value if they are not equal).

In some implementations, the autonomous vehicle system may calculate multiple confidence values using multiple approaches (e.g., each of the two above approaches, combinations thereof, etc.). For example, the autonomous vehicle system may calculate a first confidence value using the predicted width of the road as described herein, and a second confidence value using the predicted lane offset of the autonomous vehicle as described herein. The final confidence value may be determined by averaging the two confidence values together, in some implementations. The confidence values may be stored in association with the corresponding predictions of the position of the autonomous vehicle in the lane, such that they may be utilized by the components of the autonomous vehicle system for navigational tasks.

In some implementations, the autonomous vehicle system can execute one or more execute a segmentation algorithm (e.g., the segmentation model(s) 380) using the first sensor data or the second sensor data to generate a segmentation of the first sensor data or the second sensor data. The segmentation may be a semantic segmentation that that classifies portions of the first or second sensor data (e.g., LiDAR points, pixels in image data, etc.) as corresponding to lane lines. Based on the position of the lane lines detected using segmentation, the autonomous vehicle system can determine additional predictions for the distance between the autonomous vehicle and the right lane line, the second lane line, or from the center of the lane.

The additional predictions generated by the autonomous vehicle system using segmentation techniques may be compared with the predictions generated using the first and second artificial intelligence models to determine additional or alternative confidence values. In an implementation where the confidence values are additional, the autonomous vehicle system may average the additional confidence value(s) with the aforementioned confidence values to generate a final confidence value that indicates whether the predicted position of the autonomous vehicle in the lane is accurate. The additional confidence value may be stored in association with the segmentation data, which may include additional predictions of the location of the autonomous vehicle in the lane of the road.

The autonomous vehicle system may utilize combinations of both LiDAR- and camera-based segmentation techniques to provide a more holistic view of the environment surrounding the autonomous vehicle system, when available. A LiDAR-based segmentation model may generate lane line segmentations using LiDAR data as input, and a camera-based segmentation model may generate lane line segmentations using image data as input. This may include calculating additional or alternative confidence values that each correspond to predictions generated using both LiDAR- and camera-based segmentation models. The LiDAR- and camera-based segmentation models may be executed in parallel. In some implementations, a segmentation confidence value may be generated by comparing a predicted location of the autonomous vehicle within the lane generated using a LiDAR-based segmentation model to a corresponding prediction generated using a camera-based segmentation model. The segmentation confidence value may be generated as the average between the two segmentation types, in some implementations.

At step 550 of the method 500, the autonomous vehicle system can navigate the autonomous vehicle based on the confidence value. To do so, the autonomous vehicle system may provide a predicted location of the autonomous vehicle, or the predicted dimension of the lane of the road, as input to navigation components of the autonomous vehicle system if the confidence value exceeds a threshold value. Various external factors may affect the accuracy of the predictions made by the artificial intelligence models described herein, including adverse weather that obscures lane lines, general occlusion of lane lines (e.g., by other vehicles), or missing paint, among other external factors.

Therefore, when the autonomous vehicle system identifies a prediction of the autonomous vehicle within the lane that corresponds to a confidence value that exceeds a threshold, that prediction may be utilized in the event that future (within a predetermined time threshold) predictions lose confidence due to external factors. For example, if a "lazy actor" (e.g., another vehicle on the roadway) drifts across a lane line and obscures it from view, the confidence value for a prediction of the position of the autonomous vehicle in the lane may decrease because a lane line is hidden by another vehicle. In such implementations, the autonomous vehicle system can utilize the previous "confident" lane position prediction for navigational tasks. Similar techniques may be utilized when paint is missing from portions of lane lines.

In some implementations, the autonomous vehicle system may ignore or disregard one or more predictions of only those predictions contribute negatively to the confidence value, or if one or more external obstacles detected via an object detection or tracking model (e.g., the target object classification component 340) detects an external condition that may render prediction(s) by one or more artificial intelligence model described herein inaccurate. For example, if the autonomous vehicle system executes an object detection or tracking model that detects another vehicle or obstacle is obscuring the right-most lane line of the lane in which the autonomous vehicle is traveling, the autonomous vehicle system may disregard the output of the right lane distance model when calculating confidence scores.

Similar approaches may be utilized in different weather conditions. For example, LiDAR data, and therefore nay artificial intelligence models that utilize LiDAR data as input, may be less accurate when the road is wet or in rainy conditions. Therefore, the autonomous vehicle system may disregard the output of said models under those or similar weather conditions. Although the aforementioned techniques describe calculating a confidence for the position of the autonomous vehicle in the road, it should be understood that similar techniques may be utilized to calculate a confidence value for various road features, such as the width of the lane in which the autonomous vehicle is traveling. Navigating the autonomous vehicle may include automatically causing the autonomous vehicle to drive within the lane while complying with local traffic regulations. This may include correcting the position of the autonomous vehicle within the lane if the autonomous vehicle has deviated from an optimal location within the lane.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:
   receiving, by one or more processors coupled to non-transitory memory, first sensor data from a first sensor of an autonomous vehicle and second sensor data from a second sensor of the autonomous vehicle, the first sensor data and the second sensor data captured during operation of the autonomous vehicle;
   generating, by the one or more processors, based on the first sensor data, a first prediction of a dimension of a lane of a road by executing a first artificial intelligence model;
   generating, by the one or more processors, based on the second sensor data, a second prediction of a position of the autonomous vehicle within the lane of the road by executing a second artificial intelligence model different from the first artificial intelligence model;
   determining, by the one or more processors, a confidence value for the second prediction of the position of the autonomous vehicle within the lane of the road based on the first prediction and the second prediction; and
   navigating, by the one or more processors, the autonomous vehicle based on the confidence value.

2. The method of claim 1, wherein the first sensor data comprises light detection and ranging (LiDAR) data and the second sensor data comprises image data.

3. The method of claim 1, wherein the first artificial intelligence model is trained to generate the first prediction using the first sensor data as input.

4. The method of claim 3, wherein the second artificial intelligence model is trained to generate the second prediction using the second sensor data as input.

5. The method of claim 4, wherein the first artificial intelligence model comprises a regression model and the second artificial intelligence model comprises a neural network.

6. The method of claim 1, further comprising:
   generating, by the one or more processors, a third prediction of the position of the autonomous vehicle within the lane of the road based on the first sensor data; and determining, by the one or more processors, the confidence value for the second prediction of the position of the autonomous vehicle within the lane of the road further based on the third prediction.

7. The method of claim 1, further comprising:

executing, by the one or more processors, a segmentation algorithm using the first sensor data or the second sensor data to generate a segmentation of the first sensor data; and determining, by the one or more processors, the confidence value for the second prediction of the position of the autonomous vehicle within the lane of the road further based on the segmentation.

8. The method of claim 1, wherein the first prediction comprises a prediction of a width of the lane.

9. The method of claim 1, wherein the second prediction comprises a distance from a left lane line, a distance from a right lane line, or a distance from a center of the lane.

10. The method of claim 1, further comprising determining, by the one or more processors, based on the first sensor data or the second sensor data, a lane offset for the autonomous vehicle.

11. A system, comprising:

one or more processors coupled to non-transitory memory, the one or more processors configured to:

receive first sensor data from a first sensor of an autonomous vehicle and second sensor data from a second sensor of the autonomous vehicle, the first sensor data and the second sensor data captured during operation of the autonomous vehicle;

generate, based on the first sensor data, a first prediction of a dimension of a lane of a road by executing a first artificial intelligence model;

generate, based on the second sensor data, a second prediction of a position of the autonomous vehicle within the lane of the road by executing a second artificial intelligence model different from the first artificial intelligence model;

determine a confidence value for the second prediction of the position of the autonomous vehicle within the lane of the road based on the first prediction and the second prediction; and navigate the autonomous vehicle based on the confidence value.

12. The system of claim 11, wherein the first sensor data comprises light detection and ranging (LiDAR) data and the second sensor data comprises image data.

13. The system of claim 11, wherein the first artificial intelligence model is trained to generate the first prediction using the first sensor data as input.

14. The system of claim 13, wherein the second artificial intelligence model is trained to generate the second prediction using the second sensor data as input.

15. The system of claim 14, wherein the first artificial intelligence model comprises a regression model and the second artificial intelligence model comprises a neural network.

16. The system of claim 11, wherein the one or more processors are further configured to:

generate a third prediction of the position of the autonomous vehicle within the lane of the road based on the first sensor data; and determine the confidence value for the second prediction of the position of the autonomous vehicle within the lane of the road further based on the third prediction.

17. The system of claim 11, wherein the one or more processors are further configured to:

execute a segmentation algorithm using the first sensor data or the second sensor data to generate a segmentation of the first sensor data; and determine the confidence value for the second prediction of the position of the autonomous vehicle within the lane of the road further based on the segmentation.

18. The system of claim 11, wherein the first prediction comprises a prediction of a width of the lane.

19. The system of claim 11, wherein the second prediction comprises a distance from a left lane line, a distance from a right lane line, or a distance from a center of the lane.

20. The system of claim 11, wherein the one or more processors are further configured to determine, based on the first sensor data or the second sensor data, a lane offset for the autonomous vehicle.

\* \* \* \* \*